Patented Sept. 22, 1936

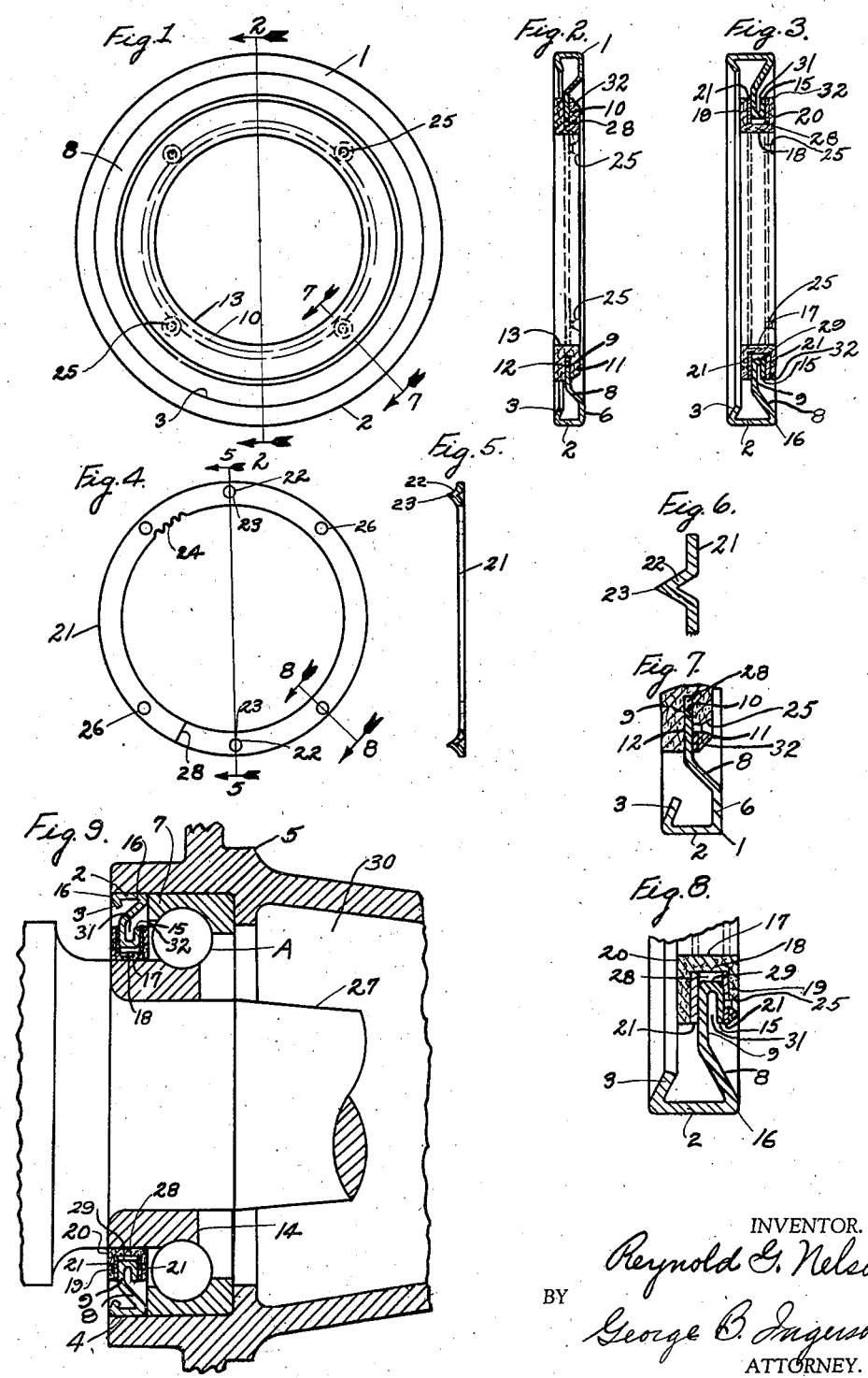

2,055,180

UNITED STATES PATENT OFFICE 2,055,180

SEALING DEVICE

Reynold G. Nelson, Pontiac, Mich., assignor to Alrey Steel Products Company, Clarkston, Mich.

Application August 11, 1934, Serial No. 739,467

8 Claims. (Cl. 286—5)

My invention relates to improvements in sealing devices having a retainer member for supporting the sealing material; and the objects of my improvement are, first, to provide a sealing device having a sealing bushing rotatively supported relative to its retainer or supporting member; second, to provide a sealing device having a sealing bushing adapted to be located concentrically or eccentrically relative to a supporting member; third, to provide a sealing device having its retainer or seal supporting member constructed of a sole member; fourth, to provide a sealing device with means for facilitating its removal from its assembled position; fifth, to provide a sealing device having wear members between contacting surfaces of a sealing member and its supporting member; sixth, to provide a sealing device having movably mounted means adapted to throw outwardly and away from its sealing surfaces, any abrasive, dirt or similar material which contacts the sealing device; seventh, to provide a sealing device with means for guiding a flow of lubricant to its inner surfaces; eighth, to provide a sealing device having wear washers provided with means for securing the wear washers to the sealing material; ninth, to provide a sealing device adapted to be constructed of two parts only; tenth, to provide a sealing device having a retainer member provided with an annular flange located substantially in a plane extending intermediate its sides for supporting a sealing member; eleventh, to provide a sealing device having a frictionally supported sealing member; twelfth, to provide a sealing device having a groove for conducting lubricant to the lower portion of and away from the sealing device; and thirteenth, to provide a sealing device which utilizes the reaction developed by the lubricant in a chamber for more efficiently sealing by the sealing device.

I attain these objects by the mechanism illustrated in the accompanying drawing, in which:—

Figure 1 is a side elevation of the sealing device; Fig. 2, a sectional view of the sealing device disclosed in Fig. 1, said sectional view being taken on the line 2—2, Fig. 1; Fig. 3, a sectional view of a modified design of my sealing device disclosing wear washers therein; Fig. 4, a side elevation of one of the wear washers disclosed in Fig. 3; Fig. 5, a sectional view of one of the wear washers disclosed in Fig. 4, said sectional view being taken on the line 5—5, Fig. 4; Fig. 6, an enlarged partial section of a portion of one of the wear washers disclosing its imbedding portion; Fig. 7, an enlarged partial section of the sealing device disclosed in Fig. 2, said section being taken through one of the oil holes of the sealing bushing on the line 7—7, Fig. 1; Fig. 8, an enlarged partial section of a sealing device disclosed in Fig. 3, said section being taken through one of the oil holes of the wear washers on the line 8—8, Fig. 4; and Fig. 9, a vertical section disclosing a partial spindle and front hub assembly of an automobile vehicle with my sealing device assembled therein.

Similar numerals refer to similar parts throughout the several views.

The sealing device as disclosed in Figs. 1 and 2 comprises the housing or retainer 1 which is constructed with the peripheral flange 2 extending parallel with the axis of the sealing device and having at one of its sides the inturned flange or edge 3 for facilitating the removal of the sealing device from its assembled position in the bore 4 of a hub or similar unit as disclosed in Fig. 9, the peripheral flange 2 extending inwardly at the outer of one of its sides to form a side wall portion 6 of the housing 1, said side wall portion 6 extending substantially at right angles to the axis of the sealing device. The side wall portion 6, together with the peripheral flange 2 and the inturned flange 3 forms the outer side extremities of the sealing device for locating said sealing device in its assembled position in abutment with a unit such as the outer race member 7 of the bearing assembly A as disclosed in Fig. 9.

The side wall portion 6 is extended to form the inclined portion 8 of the flange 9 which is located substantially centrally between the outer side extremities of the sealing device and forms an annular supporting portion having the hole or opening 10 extending therethrough to extend around the shaft portion, such as the spindle 27 and the inner race member 14, as disclosed in Fig. 9, with which the sealing device is assembled, said hole or opening 10 being located substantially concentric with the axis of the sealing device.

The sealing or packing material or bushing 11 may be constructed of cork, felt, asbestos, graphite and lead, or any suitable or similar material which will best withstand use in or adjacent oil or similar material which may have a deteriorating effect on the sealing material 11.

Also the sealing materials or bushings 11 and 20 may be constructed with sufficient resilient characteristics to permit portions of the bushings to be displaced so that the wear rings 21 may be assembled in the grooves thereof. Also if desired, the wear rings 21 may be constructed with a split or joint 28 to permit the wear washers to be displaced to facilitate their assembly in said bushings.

The sealing material 11 is provided with a groove or slot 12 extending around its periphery and adapted to receive therein the flange 9 of the housing 1. The groove or slot 12 extends inwardly from the periphery of the sealing material 11 for a portion only of the radial depth of the sealing material 11, the diameter at the bottom of the groove 12 being substantially less than the diameter of the inner edge of the flange 9, thus insuring that the sealing material 11 may have an operating or clearance space 28 in which to move eccentrically relative to the diameter of the inner edge of the flange 9 to accommodate any misalignment of the parts of which the sealing device is assembled and also to allow the sealing material 11 to revolve without the inner edge of the flange 9 contacting with the diameter at the bottom of the groove 12 of the sealing material 11, thus insuring that the sliding engagement of the sealing material 11 with the flange 9 will be restricted to the side surfaces of the flange 9 and eliminating any gouging or cutting by engagement of the inner edge of the flange 9 with the bottom diameter of the groove 12 of the sealing material 11.

In assembly, the bore 13 of the sealing material 11 is constructed slightly smaller than the outer diameter of the inner race member 14 of the bearing assembly A or similar unit with which the sealing device is assembled so that the sealing material will tend to be distorted sufficiently to cause the sealing material 11 to firmly grip and be fixedly connected with the inner race member 14 or similar part to which the sealing device is assembled, thus again insuring that the sliding or movable contact of any of the parts of the sealing device will be restricted to the sides of the slot 12 of the sealing material 11 in engagement with the side surfaces of the flange 9 of the housing 1.

Figs. 3, 8 and 9 disclose my sealing device with a housing or retainer 16 of slightly greater width than the housing 1 of the sealing device disclosed in Figs. 1, 2 and 7, this additional width of the housing 16 being necessary to accommodate the flange 9 being extended to form the flange 15 which is bent or formed to extend substantially parallel with the flange 9 and thus providing for an increased inner surface of the bore 29 of the sealing device disclosed in Figs. 3, 8 and 9, so that if there should be accidental contact between the surface of the bore 29 and the bottom surface 18 of the groove 19 of the sealing material or bushing 20 of the sealing device disclosed in Figs. 3, 8 and 9, there would be lesser chance of wear occurring due to the greater area of contactual surfaces. However, the diameter at the bottom of the grooves 12 and 19 are preferably made with sufficiently lesser dimensions so that no contact occurs between the surfaces at the bottom of the grooves 12 and 19 and the inner surfaces of the bores 10 and 29 of the flanges 9 and 15 even when the sealing materials 11 and 20 have moved to their maximum eccentricity relative to the housings 1 and 16.

It is also to be noted that the flange 15, together with the flange 9, in Figs. 3, 8 and 9, will form a considerably stronger central portion of the housing 16 than with the single flange 9 only as disclosed in the housing 1 of Figs. 2 and 7, the sealing device as disclosed in Figs. 3, 8 and 9 being more suitable for many installations in which economy of construction such as disclosed in the housing 1 would not be necessitated.

Where desired the wear washers 21 may be installed adjacent the sides of the flange 9 of the housing 1 and between the outer side surfaces of the flanges 9 and 15, as disclosed in Figs. 3, 8, and 9, to eliminate any wear, gouging or injury to the side surfaces of the grooves or slots 12 and 19 in the sealing materials 11 or 20.

In order to confine the sliding contact solely to and between the side surfaces of the flanges 9 and 15 and the inner side surfaces of the wear washers 21, the wear washers may be formed with a displaced portion 22, as disclosed in Figs. 4, 5 and 6, and having the sharp point or end portion 23, the point or end portion 23 and the displaced portion 22 of the wear washers 21 being forced into the sides of the grooves 12 or 19 according to the sealing device design used, when the wear washers 21 are assembled therein, the point or end portion 23 and the displaced portions 22 thus insuring that there will be no relative movement between the wear washers 21 and the sealing materials 20 or 11.

Also one or more serrated portions 24 with sufficient projections thereon may be formed on the wear washers 21 where desired to provide additional means for securing the wear washers 21 and the sealing materials together.

Also the sealing materials may be provided with the oil holes 25 located on one of the sides only of the sealing device and thus within the chamber 30, as in Fig. 9 so that the oil may enter from the chamber containing the supply of oil into one side of the sealing device through the holes 25 in the sealing material and thus flow into the grooves of the sealing devices and when the wear washers 21 are used the oil will also flow through the holes 26 in the wear washers 21 to the inside surfaces of the wear washers, thus lubricating the contacting surfaces of the flanges 9 and 15, thus reducing friction and extending the life of the sealing devices.

Also it is to be noted that the wear washers 21 will be caused to rotate with the sealing material 20 and thus form a rotating portion of the seal which will tend to throw abrasive, dirt and similar material which would tend to injure the bearings which are being protected by the sealing device, outwardly and away from the sealing surfaces and thus prevent said abrasive, dirt and other similar materials from entering through or past the sealing device into the protected areas of mechanisms with which my sealing devices are used.

Fig. 9 discloses a typical installation of one of my sealing devices in conjunction with the front hub 5 of an automotive vehicle and which is mounted at the rear portion of the steering spindle 27 through the medium of the bearing assembly A and over the inner race member 14 of the bearing assembly A, the housing 16 having its peripheral flange 2 secured in the bore 4 by being placed therein to a position against the side surface of the outer race member 7 of the bearing assembly A.

Also it is to be understood that my sealing device may be used, if desired, in installations in which the sealing material may be utilized in either rotative or non-rotative positions to perform its sealing functions, the economical construction of my sealing device being advantageous in any and all installations in which a sealing device is used.

The groove 31 which extends around the inner side of the flange 9, Figs. 3, 8 and 9, relative to the chamber 30 and between the flanges 9 and 15 provides a means for conducting the lubricant, which splashes on or is thrown against the sealing device from the chamber 30, around and downwardly back to the main portion of the chamber 30 and thus diverts the lubricant from entering between the relatively moving surfaces between which it might escape. Also it has been found that the incorporation of the angular or chamfered surface 32 at the inner side of the sealing materials 11 and 20, relative to the chamber 30, utilizes the reaction or thrust of the lubricant, which is centrifugally thrown outwardly from and tends to pile up adjacent and around the sealing surfaces, against the angular surface 32 to exert a horizontal or axial thrust against the inner side of the sealing members 11 and 20 and thus force the inner side of the sealing materials more tightly and closely against the flanges 9 or 15 to enable the sealing device to more efficiently prevent the passage of the lubricant between the relatively movable surfaces of the sealing device.

Also it is to be understood that the projections 22 of the wear washers 21 may be constructed, if desired, by partially blanking a portion of the material of the wear washer 21 to form a pointed flange extending substantially at right angles to the face of the wear washers 21 for imbedding into the sealing materials 11 or 20.

I claim:

1. In a sealing device for closing an open end of a chamber in a mechanism, the combination of a housing provided with a cylindrical wall portion with its axis located in a plane extending substantially parallel with the axis of the sealing device, said cylindrical wall portion having an inturned flange located at the outer side of the open end of the chamber of the mechanism, said inturned flange being adapted to be engaged by a tool for removing the sealing device from the open end of the chamber of the mechanism, said inturned flange being located in a plane extending at an angle with a plane extending at right angles with the axis of the sealing device, said cylindrical wall portion being extended to form an abutment portion at the inner side of the sealing device relative to the chamber of the mechanism, said abutment portion of said housing being extended to form a rigid flange portion located in a plane extending at an angle with a plane extending at right angles to the axis of the sealing device, said rigid flange portion being further extended to form an annular flange located in a plane extending at right angles to the axis of the sealing device and substantially centrally between the ends of the sealing device, said cylindrical wall portion together with said abutment portion, said inturned flange and said rigid flange forming a chamber open at the outer side only of the open end of the chamber of the mechanism and extending for the total inside width of the sealing device between said inturned flange and said abutment portion and forming a clearance space for said tool for removing the sealing device from the open end of the chamber of the mechanism, and a bushing of sealing material provided with a peripheral groove engaging said annular flange of said housing.

2. In a sealing device for a mechanism, the combination of a housing provided with a cylindrical wall portion having its axis located in a plane extending substantially parallel with the axis of the sealing device, said cylindrical wall portion having an inturned flange at one of its ends inclined inwardly at an angle to form an undercut wall portion adapted to receive a tool therebehind to facilitate removal of the sealing device from an assembled position in the mechanism, said housing further having its cylindrical wall portion extended and folded inwardly at the other of its ends to form a second undercut wall portion extending in a plane located angularly with a plane extending at right angles to the axis of the sealing device, said second undercut wall portion being extended to form an annular flange extending in a plane extending at right angles with the axis of the sealing device, said first mentioned undercut wall portion, together with said cylindrical and said second undercut wall portions forming a clearance chamber for said tool and having an open side extending between the edge portion of said first mentioned undercut wall portion and a side surface of said second undercut wall portion, and a bushing of sealing material provided with a peripheral groove having side wall portions adapted to movably engage both sides of said annular flange of said housing with constantly equal pressures to provide sealing thrusts against both sides of said annular flange, the bottom diameter of said peripheral groove being substantially less than the inside diameter of said annular flange to permit said bushing to be positioned eccentrically relative to said annular flange of said housing, the points of connection between said second undercut wall portion and said annular flange of said housing being located with a diameter substantially larger than the diameter of said side wall portions of said peripheral groove to permit eccentric movement of said bushing relative to said housing.

3. In a sealing device for a mechanism, the combination of a sealing member, and a housing formed from a sheet of relatively thin material of uniform thickness, said housing having a cylindrical wall portion extending for the maximum axial length of the sealing device and having an inturned flange at one of its ends forming an undercut wall portion, said cylindrical wall portion being provided with a second inturned flange forming a second undercut wall portion at the other of its ends, said second undercut wall portion having an inner diameter substantially less than the inner diameter of said first mentioned undercut wall portion, said first mentioned undercut wall portion, together with said cylindrical and said second undercut wall portions forming a chamber having an open side extending from the edge surface of said first mentioned undercut wall portion to the outer side surface of said second undercut wall portion, said chamber being adapted to receive a tool therein for engaging said first mentioned undercut wall portion to facilitate removal of the sealing device from the mechanism, said second undercut wall portion being adapted to engage and deflect the tool outwardly from said sealing member, said second inturned flange being extended to form an annular flange having oppositely disposed sides engaging said sealing member, the minimum diameter of said chamber being greater than the maximum diameter of said sealing member.

4. In a sealing device for a mechanism, the combination of a housing member provided with a chamber extending circumferentially therearound and for the total inside axial length of said housing, said chamber having an open side extending between a pair of inclined wall portions intersecting one another when extended, said chamber being adapted to receive a tool when entered therein and engaging one of said inclined walls to facilitate removal of the sealing device from the mechanism, said housing member being further provided with an annular flange located in a plane extending substantially at right angles to the axis of the sealing device and extending substantially through said chamber, said annular flange being fixed against axial movement relative to the remainder of said housing, and a bushing of sealing material having a groove adapted to constantly engage opposite sides of said annular flange with equal pressures and having a bottom diameter substantially smaller than the inside diameter of said annular flange to permit eccentric movement of said bushing relative to said annular flange.

5. In a sealing device, the combination of a housing having an outermost wall portion extended to form an annular flange extending angularly from and relative to one of the sides of said housing, said annular flange having an innermost portion connected therewith and positioned between the sides of the housing, said innermost portion extending annularly in a plane located substantially at right angles to the axis of the sealing device, said outermost wall portion being further extended at its other side to form a second annular flange extending angularly from and relative to said other side, said second annular flange extending toward said first mentioned annular flange and separated therefrom by an opening forming an open side of a chamber formed by said first mentioned and said second annular flanges, together with said outermost wall portion of said housing, said second annular flange being adapted to be engaged by a tool entered within said chamber to facilitate the removal of the sealing device from an assembled position, and sealing means engaging opposite sides of said innermost portion of said annular flange, said sealing means being located annularly within the annular point of connection of said innermost portion and said angularly extending portion of said annular flange of said housing.

6. In a sealing device, the combination of a housing formed from a sole piece of sheet material having equal thickness throughout, said housing being provided with a sole flange having outer and oppositely disposed sealing surfaces for engaging a sealing member, said sole flange being located in a plane extending at right angles to the axis of the sealing device substantially at the center of said housing, said sole flange extending angularly at its periphery to form a side wall of said housing, said side wall being further extended to form a cylindrical portion surrounding said sole flange, said cylindrical portion being extended to form an inwardly extending flange adapted for engagement with a tool to facilitate removal of the sealing device from an assembled position, and a sealing member having inner and oppositely disposed sealing surfaces for engaging the outer and oppositely disposed sealing surfaces of the sole flange of said housing.

7. In a sealing device for a chamber containing lubricant, the combination of a housing formed from a sole piece of sheet material, said housing having a cylindrical portion extended to form a flange connecting with one end of said cylindrical portion, said flange being extended to form an annular portion located intermediate the ends of said cylindrical portion, said annular portion having a sole U-shaped section located at one side only of said annular portion and having its open side forming an annular groove communicating with said chamber containing lubricant, and sealing means for engaging the outer sides of the wall portions forming said U-shaped section of said annular portion of said housing, said sealing means engaging one side of the main portion of said annular portion and the outermost wall portion of said U-shaped section of said annular groove.

8. In a sealing device for a chamber containing lubricant, the combination of a housing provided with a cylindrical portion together with a flange supported by said cylindrical portion, said flange having a boss portion having a sole annular groove extending therearound at one of its sides and having its open side on the outside of said boss portion, the open side of said annular groove being located with a substantial space between said open side and said cylindrical portion to facilitate drainage of the lubricant from said annular groove to said chamber containing lubricant, and sealing means engaging oppositely disposed surfaces of the main wall portion of said flange and the outer surface of the outer wall portion of said groove of said boss portion of said housing, the peripheral edges of said sealing means being located with a substantial space between said peripheral edges and said cylindrical portion of said housing.

REYNOLD G. NELSON.